May 28, 1968  L. B. STEIN, JR., ET AL  3,386,059

POWER LINE COUPLING DEVICE

Filed Oct. 21, 1965  4 Sheets-Sheet 1

INVENTORS.
LAURENCE B. STEIN, JR.
CHARLES WASSERMAN
BY Moses, McGlew & Toren
ATTORNEYS.

May 28, 1968 L. B. STEIN, JR., ET AL 3,386,059
POWER LINE COUPLING DEVICE
Filed Oct. 21, 1965
4 Sheets-Sheet 2
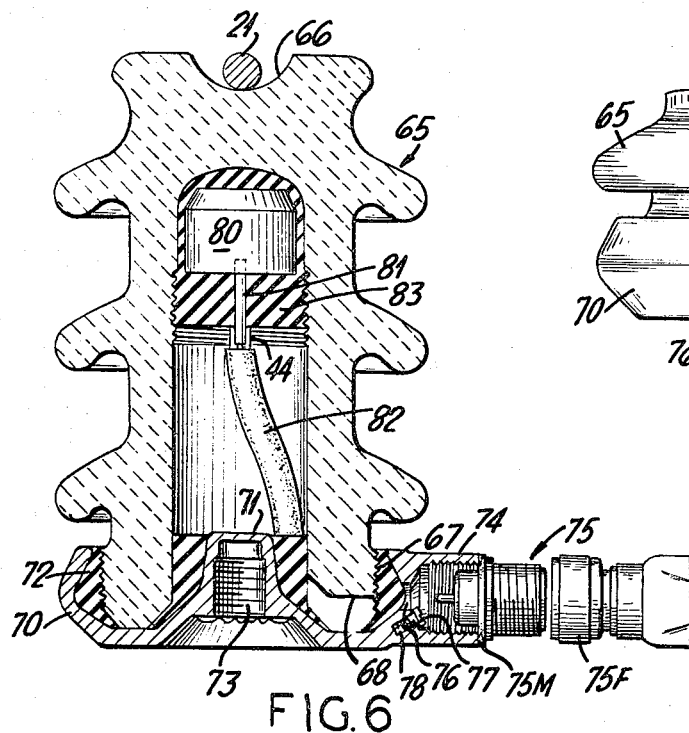
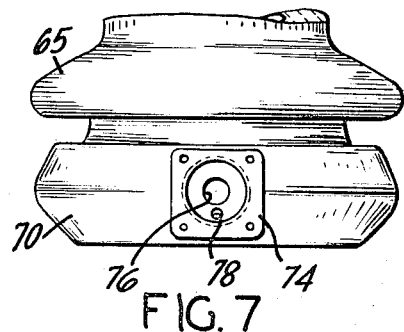
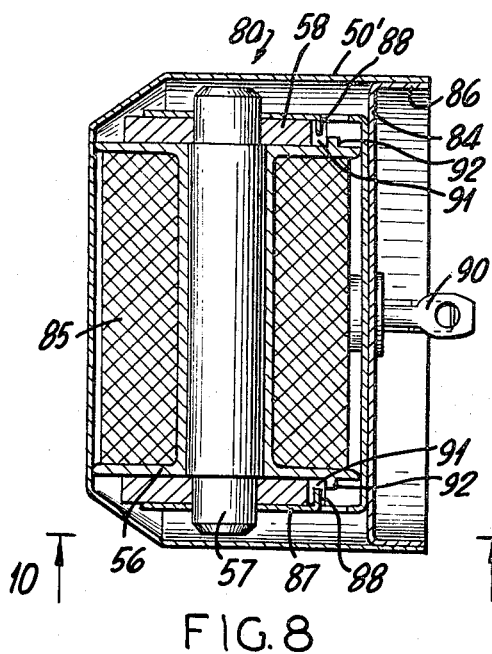
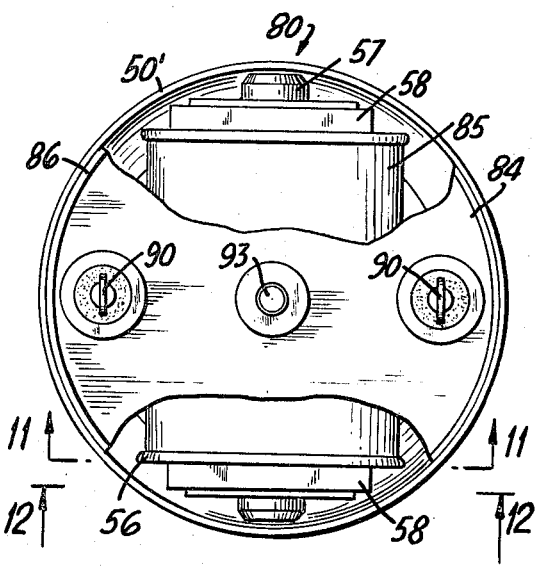
INVENTORS.
LAURENCE B. STEIN, JR.
CHARLES WASSERMAN
BY
Moses, McGlew & Toren
ATTORNEYS.

May 28, 1968  L. B. STEIN, JR., ET AL  3,386,059
POWER LINE COUPLING DEVICE

Filed Oct. 21, 1965  4 Sheets-Sheet 3

INVENTORS.
LAURENCE B. STEIN, JR.
CHARLES WASSERMAN
BY
Moses, McGlew & Toren
ATTORNEYS.

May 28, 1968 L. B. STEIN, JR., ETAL 3,386,059
POWER LINE COUPLING DEVICE
Filed Oct. 21, 1965 4 Sheets-Sheet 4
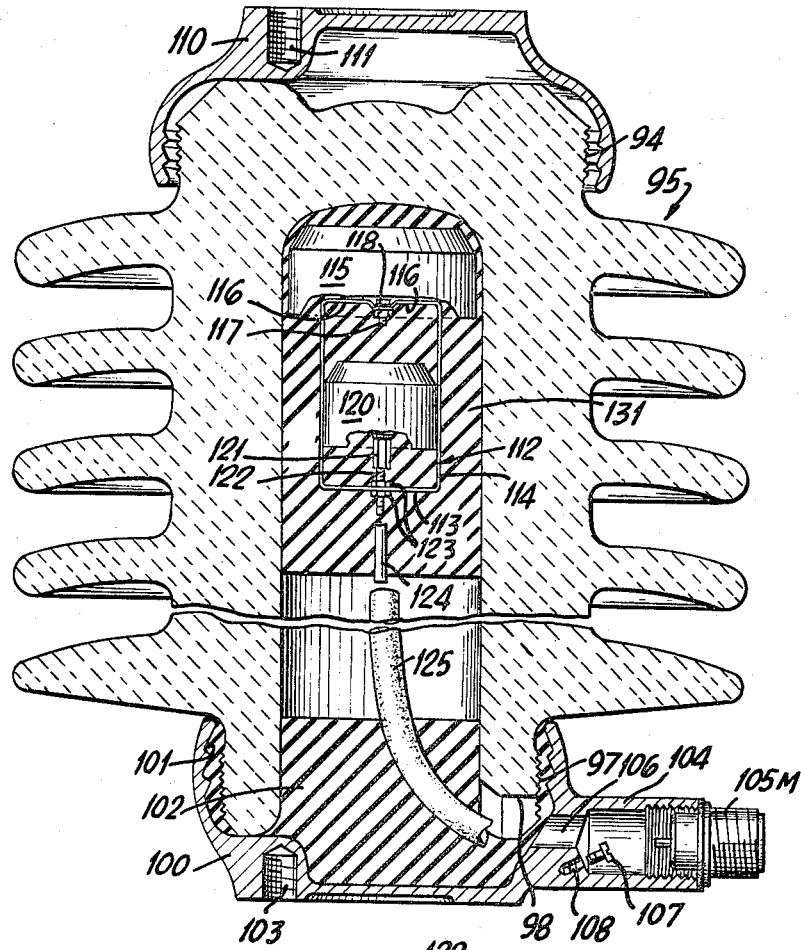
FIG.13
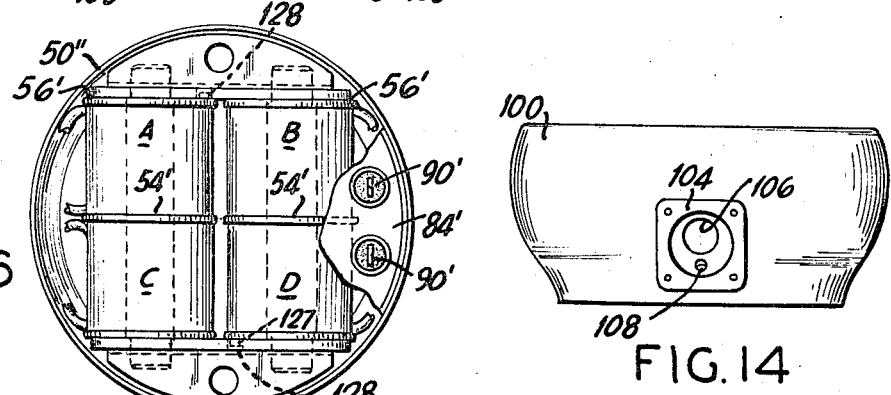
FIG.16
FIG.14
FIG.15
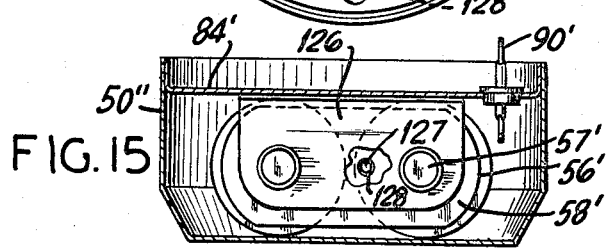
INVENTORS
LAURENCE B. STEIN, JR.
CHARLES WASSERMAN
BY
Moses, McGlew & Toren
ATTORNEYS.

United States Patent Office 3,386,059
Patented May 28, 1968

3,386,059
POWER LINE COUPLING DEVICE
Laurence B. Stein, Jr., Hingham, Mass., and Charles Wasserman, Baltimore, Md., assignors to Sigma Instruments, Inc., a corporation of Massachusetts
Continuation-in-part of application Ser. No. 301,516, Aug. 12, 1963, which is a continuation-in-part of application Ser. No. 338,096, Jan. 16, 1964. This application Oct. 21, 1965, Ser. No. 500,109
9 Claims. (Cl. 336—84)

ABSTRACT OF THE DISCLOSURE

A coupling device for inductive coupling to a high voltage power line conductor, and serving as a fixed insulating support for the conductor, is disclosed as including a high voltage hollow insulator having a closed outer and an open inner end, with the exterior of the outer end having means for receiving a current conductor and enabling the insulator to be located in predetermined angular orientation with respect to the longitudinal extent of the supported conductor. One or more coils are mounted within the insulator adjacent the closed outer end thereof, with the axes of the coils in predetermined orientation with respect to the conductor, and with the coil or coils spaced inwardly from the conductor. A closure of highly electrically conductive and non-magnetic metal encloses the coil or coils within the insulator, and the coil leads are brought out through the enclosure to terminals thereon. A metal base covers the open end of the insulator and output leads extend from the coil terminals in insulated relation through the base, the base being sealed on the open inner end of the insulator. The base may have a nipple extending therefrom and supporting one element of a known type of electrical connector, for connection to a mating element of such known type of an electrical connector. The metal enclosure for the coils is preferably supported on a hollow tube extending longitudinally of the insulator, and the insulator may be filled with insulating compound or may have a dielectric gas, under high pressure, supplied to the interior thereof, or both expedients may be used.

---

The present application is a continuation-in-part of copending application Ser. No. 301,516, filed Aug. 12, 1963, now abandoned, and copending application Ser. No. 338,096, filed Jan. 16, 1964, now Patent No. 3,251,-014, issued May 10, 1966.

The increasing use of electricity has required higher voltages for the transmission and distribution of electric power. Correspondingly, this has resulted in greater complexity of transmission and distribution arrangements, and in an increased need for means for measuring accurately and conveniently the current in the transmission and distribution circuits for the purposes of relaying, metering and control.

Known arrangements for measuring the current of transmission and distribution line conductors involves the use of current transformers. Current transformers are relatively expensive, difficult to install, and require separate supporting arrangements. Among the difficulties involved is that it is necessary to cut or break the line in order to connect the current transformer into the line. Thus, the installation of such devices has required elaborate safety precautions as well as necessitating the temporary shutdown of a transmission or distributing line. Such closing down of a line is not always convenient and frequently may be undesirable due to interruption of power to a load or consumer. Consequently, there has been a long felt need for a simple and inexpensive means for coupling to a transmission or distribution power line without interruption of delivery of power over the line, and without "breaking into" the line or making physical connections thereto.

It is a well known fact that any line conductor having current flowing therethrough is surrounded by a magnetic field and an electric field which have parameters determined by the current being carried by the conductor. For this reason, it is possible to make an inductive coupling to a current carrying line to "pick-up" inductively a voltage or current which is proportional to the current being carried by the line. However, in practice, such inductive coupling to a line is difficult to effect in a practical manner, and expedients used hitherto have not been satisfactory from a commercial standpoint. As a matter of fact, most inductive pick-ups hitherto proposed have been of the manual probe-type arranged to be manually positioned in operative association with a current carrying conductor, and none have been designed for permanent installation with relation to the current carrying conductor.

A difficulty encountered with prior art inductive pick-ups has been that of the sensitivity of the pick-up coil to current surges and other disturbances, as well as the difficulty of protecting the coil against corrosion. A further difficulty has been encountered in obtaining an inductively coupled signal which is of a magnitude suitable for use in relaying, metering, or other control purposes.

Another difficulty with known pick-up arrangements has been that of providing the proper dielectric separation or insulation between the current carrying conductor and the controls. As disclosed in the above-mentioned copending applications, a simple and inexpensive solution to the foregoing problems involves the use of a hollow or tubular insulator post for supporting the current carrying conductor, this post serving also as a permanent support for the conductor, either as a station post or a line post. Within this hollow insulator there is disposed an inductive pick-up coil which has a predetermined orientation with relaton to a line conductor supported on the outer end of the post. Leads are brought from the coil through the hollow insulator post and out through the other end thereof, whereby the current in the coil may be used for relaying, metering, or other control purposes. In one arrangement, the closed end of the hollow post insulator is formed with a groove extending diametrically thereacross, and the coil within the insulator and adjacent this closed end has predetermined orientation with respect to this groove.

The advantage of this arrangement is that an effective insulation of the line conductor from the control instruments is provided by the hollow post insulator, and the latter furthermore acts not only as a permanent support for the line conductor, but also as an enclosure for the pick-up coil. It is not necessary to make electrical connections to the line conductor, to cut into the line conductor or to surround the conductor, as in the use of a current transformer, in order to obtain the control signals, as the latter are obtained inductively.

An object of the present invention is to provide an improved coupling device serving as a permanent support for a power line conductor and also serving to couple control instruments inductively to the line conductor without electrical connection to the latter.

Another object of the present invention is to provide an improved electrical coupling device serving as a permanent insulating support for a line conductor and including at least one pick-up coil and means protecting the winding of the pick-up coil from line surges and other disturbances, such as high transient voltages and currents.

A further object of the invention is to provide an electric coupling device serving as a permanent insulating support for a current carrying power conductor and enclosing means for inductively coupling control instruments to the power conductor, as well as including means whereby the coupling device may be readily, easily and simply compensated for various widths or extents of power conductors such as bus bars and the like.

Yet another object of the invention is to provide an electric coupling device for coupling to a current carrying power conductor and including a hollow post insulator serving as a permanent insulator support for the power conductor, such as a bus bar, transmission line or distribution line, this hollow post insulator enclosing inductive pick-up means and compensating means whereby the inductive pick-up means may be adapted and adjusted for conductors having various effective distances outwardly of the hollow post insulator.

Still a further object of the invention is to provide an electric coupling device of the type just mentioned including novel means protecting the inductive pick-up means against transients, surges and the like, as well as against atmospheric corrosion.

A further object of the invention is to provide an electric coupling device including a hollow post insulator serving as a permanent insulator support for a power line conductor, such as a bus bar, transmission line, or distribution line, this insulator enclosing inductive pick-up coils and compensating coils in association with the pick-up coils, and the inductive pick-up coils being constructed for greatly improved and more efficient inductive pick-up of energy from the power line conductor.

Yet another object of the invention is to provide an electric coupling device of the type just mentioned including a fitting on the inner end of the hollow post insulator providing for various mounting arrangements and accessibility to coil secondary leads.

A further object of the invention is to provide an electric coupling device serving as a permanent insulator support for a current carrying power line conductor, such as a bus bar, transmission line, or distribution line, and in which measurement of the current in the high voltage conductor is obtained without altering the physical arrangement of the major equipment supporting the conductor.

Still another object of the invention is to provide an electric coupling device of the type just mentioned including means for maintaining a reasonably constant relation between the primary current and the secondary output with various positions and shapes of primary power line conductors.

For an understanding of the principles of the invention, reference is made to the following description of typical embodiments thereof as illustrated in the accompanying drawings.

In the drawings:

FIG. 6 is a sectional view through an electrical coupling device embodying the invention and used as a line post insulator for a high voltage, current carrying power conductor;

FIG. 7 is a partial elevation view of the coupling device shown in FIG. 6, looking from the right of FIG. 6;

FIG. 8 is a sectional view of a pick-up coil assembly incorporated in the coupling device shown in FIGS. 6 and 7;

FIG. 9 is an inner end view, partly broken away, of the coil assembbly shown in FIG. 8;

FIG. 13 is a sectional view of an electrical coupling device embodying the invention and used as a station post insulator support for a high voltage current carrying bus bar or other power conductor;

FIG. 14 is a partial elevational view of a support base, included in the coupling device shown in FIG. 13, and looking from the right of FIG. 13;

FIG. 15 is an elevation view, partly in section, of a coil assembly used in the coupling device shown in FIGS. 13 and 14;

FIG. 16 is an inner end view, partly broken away, of the coil assembly shown in FIG. 15.

Figure 1:
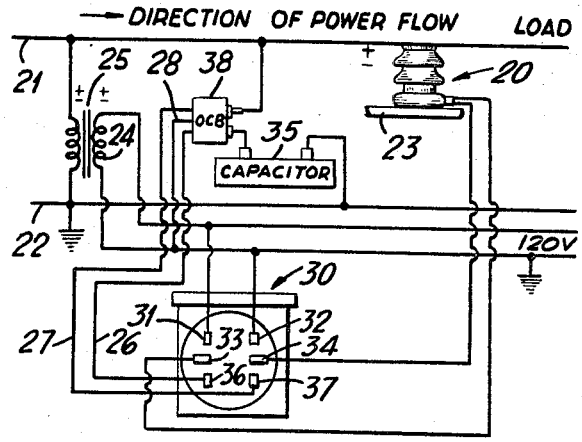
FIG. 1 is a schematic wiring diagram illustrating one embodiment of the invention electrical coupling device incorporated in a system for power factor correction.

As stated, the electrical coupling device of the invention may be used in any case where it is desired to provide metering, relaying, phase control, or other control operations in accordance with the current flowing through a high voltage transmission line, distribution line, or station bus bar. For example, the electrical coupling device may be used in a power factor control arrangement such as illustrated in FIG. 1. Referring to FIG. 1, an electrical coupling device 20 embodying the invention is shown in operative relation with one phase of a three-phase high voltage A.C. power distribution line, this one phase including high voltage, current carrying line conductors 21 and 22. Solely by way of example, coupling device 20 is illustrated as mounted on a suitable support, such as a cross-arm 23, and as serving as a permanently mounted insulating support for line conductor 21.

A transformer 25 is connected across the line conductors 21 and 22, and has a secondary winding 24 which may have a 120 volt output. Secondary winding 24 is connected to terminals 31, 32 of a control apparatus 30 which is described in detail in U.S. Patent No. 3,091,731. Control apparatus 30 has terminals 33 and 34 connected to electrical coupling device 20 which, as stated, serves as a permanent insulating support for line conductor 21. As will be described more fully hereinafter, coupling device 20 includes one or more coils inductively coupled to line 21 for inductively deriving a voltage in accordance with current flowing through line 21, and without the necessity of either breaking into line 21 or making any electrical connections thereto.

Control apparatus 30 has output terminals 36 and 37. Conductors 26 and 27 connect output terminals 36 and 37 to a suitable switching device 38, and a neutral, which may be obtained from terminal 32, is connected by a conductor 28 to device 38. Switching device 38 may be an oil circuit breaker for connecting and disconnecting a capacitor 35 relative to the transmission line 21, 22.

Apparatus 30 compares the voltage of secondary winding 24, which is representative of the voltage across transmission line 21, 22 and which is of substantially constant phase relative to the transmission line voltage, with an electrical quantity supplied by the coupling device 20. This electrical quantity corresponding in magnitude and phase angle to the current through the transmission line 21. When the electrical quantity supplied to apparatus 30 by secondary winding 24 and coupling device 20 indicates that the load connected to the transmission line is drawing a predetermined high reactive power, circuit breaker 38 is operated to connect capacitor 35 across the line. Circuit breaker 38 is operated to disconnect capacitor 35 from the transmission line when the reactive power traversing the transmission line reaches another predetermined lower level.

The general construction of electrical coupling device 20 is illustrated in FIGS. 2 through 5. Referring to these figures, the coupling device includes a hollow, essentially tubular post-type insulator 40 of porcelain or the like which is open at the inner end and is usually closed at the outer conductor-supporting end, although it may be open at both ends. This insulator is formed with the usual radial ribs or flanges 41 customary in insulators supporting high voltage transmission lines. The outer end of insulator 40 is designed to serve as a support and anchorage for a high voltage current carrying transmission line, such as the line 21 of FIG. 1, or a bus bar in a generating station or an electrical substation. When insulator 40 serves to support a high voltage transmission line, except one within a generating station or a substation, the insulator is generally referred to as a "line post." On the other hand, when the insulator 40 is used to support a bus bar or the like within a generating station, a substation, or an adjacent switching yard, it is generally referred to as a "station post" insulator. These two types of "post" insulators differ from each other in many respects, as will be mentioned more fully hereinafter.

When the coupling device 20 is used as a line post insulator, it usually supports a transmission line conductor which generally has a substantially circular cross section. For this purpose, the closed outer end of insulator 40 may be formed with a semi-cylindrical cross section groove extending diametrically thereacross, and the transmission line conductor may be laid into this groove and secured in a suitable manner, as by being tied to the exterior surface of insulator 40 by wire or the like. However, when the coupling device is used as a station post insulator, the outer end thereof may support bus bars of various shapes as well as other equipment. For this purpose, special fittings are used and, it is generally customary to provide the outer end of the insulator with a suitable mounting cap.

Figure 2:
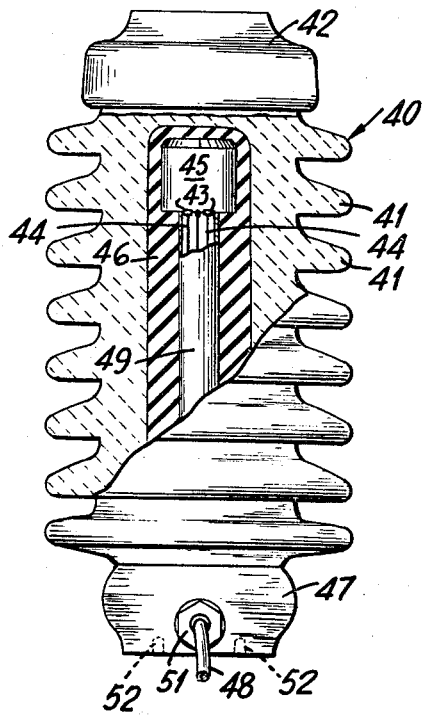
FIG. 2 is an elevation view, partly in section, illustrating the general construction and assembly of the electrical coupling device of the invention.

A feature of the present invention is that the coupling device, and particularly the insulator 40, is arranged not only to support a line conductor directly in engagement with a closed outer end, but also to receive various mounting caps which may have different forms in accordance with the particular conductor mounting arrangements to be used, such as the size and shape of bus bars, for example, and dependent upon whether or not equipment in addition to a bus bar or the like is to be mounted on the outer end of insulator 40. Therefore, as shown in FIG. 2, the outer end of insulator 40 may be provided with a metal cap 42 which may be anchored or supported thereon in any desired manner. The metal of cap 42 is a non-magnetic metal, such as bronze, copper, brass or the like so that the cap does not effect the electric field supporting the current carrying conductor supported thereby. In FIG. 2, and solely by way of example, the cap 42 is illustrated as having a flat top, but the outer surface of the cap may have any desired configuration. Also, as shown in FIG. 2, the insulator 40 is illustrated as having a closed outer end, but in certain cases the insulator may have an open outer end.

Insulator 40 serves as an enclosure and support for the inductive pick-up assembly which is generally indicated at 45. This inductive pick-up assembly, as will be described more fully hereinafter, includes at least one, and preferably plural, pick-up coils or windings, with which are associated one or more compensating or reference coils or windings. In accordance with the invention, the several coils are contained within an enclosure generally indicated at 50. This enclosure is made of a metal which has a very low electrical resistance or, correspondingly, a very high electrical conductivity. The metal may be copper, aluminum, or the like, and the high conductivity or low resistance enables the metal enclosure to dissipate the effects of the line current surges and disturbances, such as transients. Furthermore, it is important that the enclosures and its contents be protected against corrosion. For this purpose, the highly electrically conductive metal of the enclosure is further enclosed in a material which will resist corrosion. One expedient is to provide a stainless steel or plastic outer enclosure for the copper inner enclosure. Other corrosion resistance expedients may be used, however. For example, the inner copper, or the like, enclosure may be intimately associated with the outer stainless steel enclosure by physical bonding, metal deformation, or the like.

Furthermore, the can or shield surrounds the coil with an equipotential field, which may be at ground potential protecting the coil from the deleterious effects of a high electric field.

The leads of the various coils or windings within the enclosure 50 are brought out to solid-type terminals 43 which are hermetically sealed within the enclosure 50, and conductors 44, of heavier gauge than the coil leads, are connected to terminals 43 and brought out through the inner end of insulator 40. The coil or winding leads are generally relatively light gauge stranded wire, whereas the conductors 44 are heavier gauge stranded wire and thus capable of withstanding greater stress.

The interior of the insulator is filled with a suitable insulating medium. In FIG. 2, this is illustrated as a filling 46 of a potting compound having the proper dielectric strength and inertness for electrical shielding. Alternatively, the insulating medium may be highly dielectric and/or electronegative gas such as, for example, sulfur hexafluoride. Other suitable insulating materials, known to the art, may be used. An example of this is "Sylgard," which is a silicone rubber potting compound.

In the instance where a relatively solid insulating compound is used with an insulator 40, the assembly 45 may be supported by the "potting" compound. However, if the potting compound is not sufficiently stable to support the assembly 45, or if a gaseous insulating medium is used, the assembly 45 may be supported upon a tube 49 mounted within insulator 40 and through which conductors 44 are brought to the base of the insulator.

In accordance with the invention, the inner end of the insulator is designed for various mounting arrangements and access to the coil leads or to conductors 44. As illustrated in FIG. 2, the inner end of insulator 45 may be closed by a metal mounting cap 47 which may be of any suitable metal and need not necessarily be nonmagnetic. Solely by way of example, FIG. 2 illustrates a cable 48, comprising the conductors 44, as brought out through a side of cap 47 by means of a suitable outlet or nipple 51 serving to seal the cap which, in turn is sealed to the open inner end of insulator 40. For mounting purposes, cap 47 may be formed with suitable tapped holes, such as indicated at 52.

Figure 3:
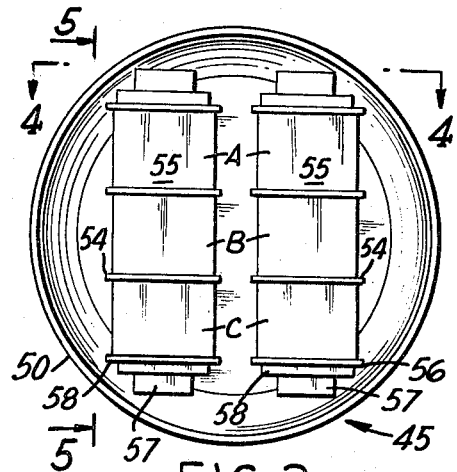
FIG. 3 is an inner end view of a coil assembly and enclosure incorporated in the coupling device.
Figure 4:
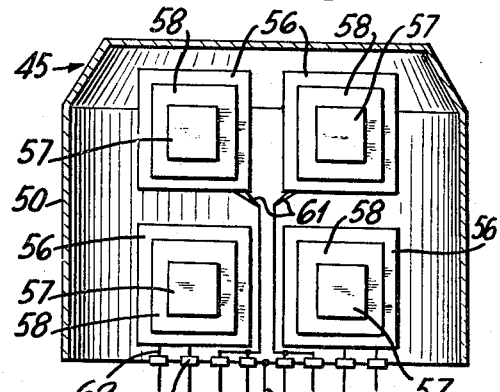
FIG. 4 is a part sectional and part elevation view taken on the line 4—4 of FIG. 3.
Figure 5:
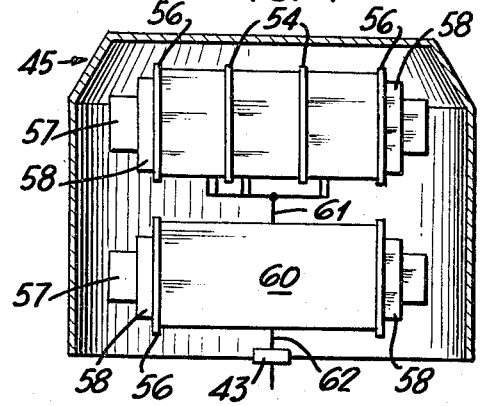
FIG. 5 is a part sectional and part elevation view taken on the line 5—5 of FIG. 3.
Figure 10:
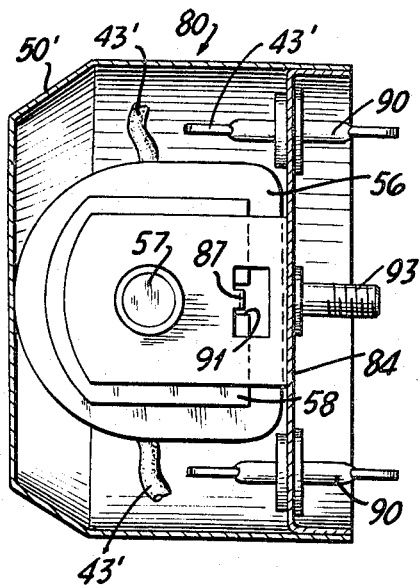
FIG. 10 is a sectional view taken on the line 10—10 of FIG. 8.
Figure 12:
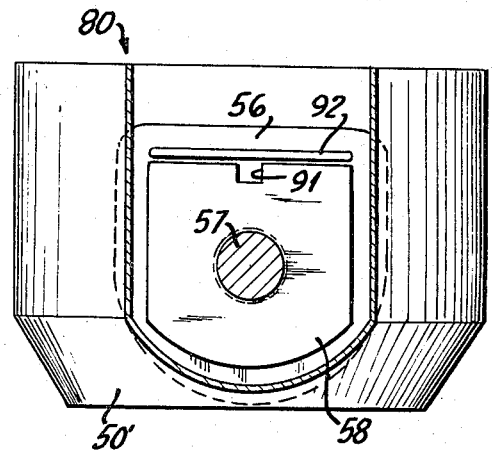
FIGS. 11 and 12 are sectional views taken on the correspondingly numbered lines of FIG. 9.
Figure 11:
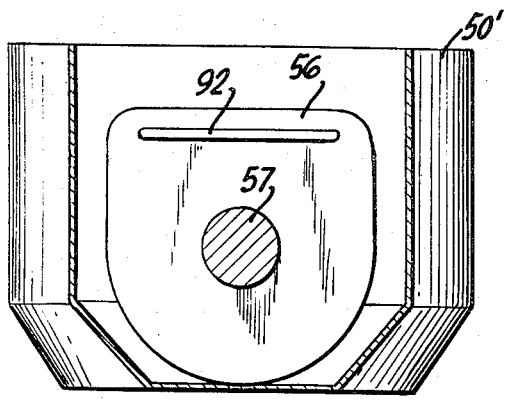

FIGS. 3, 4 and 5 illustrate the internal arrangement of the coil assembly 45. The coil assembly includes two sets of coils, the outer set comprising pick-up coils 55 and the inner set comprising compensating coils 60, which can be used not only for reference compensation, but also for automatic compensation with respect to differences in effective distance of the conductor supported on the coupling device, particularly on the insulator 40. This effective distance is determined largely by the shape and size of the conductor, and it is important that compensation be made for differences in the effective distance of a conductor from the main pick-up coils 55.

It has been found that it is very difficult to derive two or more functions from a single coil or winding. By using two or more pick-up coils in the assembly, each function can be derived from a separate coil. While there are two coils 55 illustrated, it will be noted that each of these coils is subdivided into three sections, each section constituting a separate winding. Thus, in effect, there are six pick-up coils in the coil assembly 45. For example, each coil 55 may comprise three coil sections A, B and C which are separated from each other by suitable separators 54.

The structure of the pick-up coils 55 and the compensating coil 60 is of considerable importance in the efficiency of operation of the coupling device 20. The several coils 55 and 60 are wound on the usual coil forms or spools 56 which embrace magnetic cores 57. The cores 57, which have high magnetic permeability, may be either solid, laminated or powdered, that is, sintered. An important feature of the core construction is the provision of the enlarged magnetic pole pieces 58 which are only slightly smaller than the ends of spools 56. These magnetic pole pieces greatly increase the efficiency of pick-up of the magnetic field surrounding the current-carrying line conductor.

All four coils are enclosed within the metallic cup, can or shield 50 which, as described more fully hereinafter, is provided with a suitable inner end closure fitted or sealed thereto. The several coil leads, such as indicated at 61 and 62, are generally relatively light gauge stranded wire and are brought out and soldered to the inner ends of the solid metal terminals 43. These terminals are hermetically sealed within the enclosure for coil assembly 45.

As stated previously, relatively heavy conductors or leads, which also may be stranded, are soldered or brazed to the outer ends of terminals 43 and are brought out through the inner end of insulator 40. A ground lead 63 is soldered, brazed, or welded either to can 50 or to its base, and is also brought to the inner end of the insulator where it may be grounded in a manner described more fully hereinafter. While cores 57 have been illustrated as having a square cross section, it will be understood that the cross section may be other than square, such as circular. Furthermore, the magnetic pole pieces may have a circular periphery rather than a square periphery.

As compared to a "line post" insulator, a "station post" insulator has a much squatter appearance, even though it may have the same height. Station post insulators generally are provided with metal components, supports, or caps on their outer ends which are arranged to support various types of bus bars or the like as well as, in some cases, other associated apparatus. The bus bars may be tubular, rectangular, square, or any other shape. Consequently, the "effective height" of the bus bar is determined by its size and its shape. Thus, the "effective height" of the conductor relative to the main pick-up coils 55 within insulator 40 is also dependent upon the size and shape of the particular bus bar supported on the insulator 40. The length of a "station post" insulator is much more critical that that of a "line post" insulator, for the reason that the station post insulator usually is closely associated with other nearby equipment.

FIGS. 6–12 illustrate one embodiment of the electrical coupling device of the invention as incorporated in a line post insulator. The porcelain insulator 65 has a construction which is closely similar to that of the porcelain insulator 40 of the coupling device shown in FIG. 2. Insulator 65 has a closed outer end and an open inner end. The outer surface of the closed end is formed with a generally semicircular cross section groove 66 extending diametrically thereacross and serving to support a line conductor, such as the conductor 21. The groove 66 also serves to attain a predetermined orientation of insulator 65 with conductor 21. The outer cap 42 of FIG. 2 is omitted.

The outer surface of the lateral wall of insulator 65, adjacent its inner end is also formed with a rough surface indicated at 67, for cooperation with various types of metal closures. The inner edge of the lateral wall of insulator 65 is also formed, at one point in its periphery, with the outwardly opening notch 68 whereby conductors may be lead out of the interior of the insulator. A metal cap 70 closes the open end of insulator 65, and cap 70 may be formed of suitable metal, whether magnetic or non-magnetic, although non-magnetic metal is preferred. Cap 70 is generally cup-shaped and includes an inwardly extending center protuberance 71 whereby there is defined an annular channel or gutter into which the inner end of insulator 65 is received. A suitable sealing material, such as a potting compound or cement, of which portland cement is one particular compound, may be used to seal cap 70 to the inner end of insulator 65, the sealing material being indicated at 72 as filling the annular recess in which is seated the inner end of insulator 65. Protuberence 71 is formed with an outwardly opening tapped bore 73 which may threadedly engage suitable means for anchoring cap 70, and thus insulator 65, to a cross arm of a pole or to any other suitable supporting surface.

An internally threaded nipple 74 extends radially outwardly from cap 70 and its interior communicates with the interior of cap 70 through an aperture 76. In mounting cap 70 on insulator 65, nipple 74 is radially aligned with notch 68. A grounding screw 77 is threaded into a tapped bore in the bottom or innermost surface of nipple 74. Nipple 74 is arranged to have secured thereto the male member 75M of a suitable multi-terminal connector 75 having a female member 75F. These multiple terminal connectors are well known, and are sometimes referred to as "A–N" connectors. For example, male member 75M may be bolted to nipple 74.

A coil assembly 80, which externally has the appearance of a coil assembly 45 of FIG. 2, is mounted within insulator 65 adacent the closed outer end thereof. For example, coil assembly 80 may be supported on a bracket 81 which is, in turn, secured to and supported on the outer end of a relatively rigid tube 82 serving to bring out the coil leads to the inner end of the insulator. Tube 82 is suitably supported within the insulator, for example by being imbedded within the sealing material 72, and the coil leads brought through tube 82 are extended through notch 68 and aperture 76 for connection to appropriate terminals of male connector element 75M. A suitable insulating compound, such as a silicon rubber or the like, may be packed around coil assembly 80, as indicated at 83. The ground wire having one end soldered or brazed to the metal cover of the coil assembly 80, has its other end bared and clamped in position by grounding screw 77.

FIGS. 8–12 illustrate the details of the coil assembly 80. In the particular embodiment of the electrical coupling device illustrated in FIGS. 6 and 7, which is a line post insulator device, generally only one pick-up coil is needed although a compensating coil may be provided. This coil is indicated at 85 in FIGS. 8–12 and is construction is identical with the construction of coils 55 and 60, including the magnetic core 57, the magnetic end plates 58 and the spool 56. Coil 85 is enclosed within a "can" or "cup" 50' which is identical in construction with the cup 50. Thus, cup 50' is formed from a highly electrically conductive metal such as copper or the like and has an outer layer of anti-corrosion material such as stainless steel or the like. Thereby the coil 85 is protected against corrosion by the stainless steel or the like, and is protected against transients, surges and the like by the highly electrically conductive copper of "can" 50'. A base 84 closes the open end of the cup 55' and is recessed within the cup, this base including a peripheral flange 86 which may be sealed to the cup 55'.

Coil 85 is mounted in a generally U-shaped bracket 87 which is supported upon base 84. To maintain proper orientation of the coil relative to the support bracket, the arms of bracket 87 may be formed with bent over tabs 88 which engage in notches in magnetic pole pieces 58. Also the ends of spool 56 may have rectilinear ribs 92 formed on their outer surfaces for lying against a rectilinear edge of a magnetic pole piece 58.

Base 84 has a pair of solid metal terminals 90 extending in electrically insulated relation therethrough. The coil leads, such as 43', and which are of relatively light gauge stranded wire, are soldered to the inner ends of terminals 90. The relatively heavier gauge, and generally stranded, conductors 44 leading through the tube 82 are soldered to the outer ends of terminals 90. Base 84 is further provided with a mounting bolt 93 by means of which the coil assembly 80 may be secured on the mounting bracket 81.

FIGS. 13–17 illustrate the coupling device of the invention as incorporated in a station post insulator. Insulator 95 is open at its inner end and closed at its outer end. The inner end of insulator 95 may be roughened, as at 97, and formed with a radially extending notch 98 in the same manner as the insulator 65 is formed with the notch 68. The outer end of porcelain insulator 95 is closed and is formed with a rough surface 94. However, the insulator may also have other top and bottom fixtures secured thereto.

As illustrated in FIGS. 13 and 14, the bottom cap 100 which closes the open lower end insulator 95 is cemented to the open end of the insulator by means of cement 102. Cap 100 may be formed with one or more tapped holes 103 for receiving anchoring screws, bolts or the like, and is further formed with an internally threaded nipple 104 on which there may be mounted the male member 105M of a multi-terminal connector similar to the connector 75 of FIG. 6, and arranged to have a female connector threadedly connected thereto. An aperture 106 establishes communication between the interior of nipple 74 and the "gutter" 101 in which the lower edge of insulator 95 is cemented. In cementing cap 100 to the lower end of insulator 95, aperture 106 is aligned with notch 98. The inner end of nipple 74 is formed with a relatively small diameter threaded bore 108 for receiving a grounding screw 107. From FIG. 14 it will be noted that aperture 106 is eccentric with respect to nipple 104. Furthermore, the outer face of nipple 104 is formed with threaded or tapped bores for receiving bolts or the like to anchor fitting 105M to nipple 104.

A conductor mounting cap 110 is positioned on the closed upper end of insulator 95. While insulator 95 is shown as having a closed outer end, the outer end may be open and cap 110 may be used to close the insulator as by being sealed thereto by cement or the like. Cap 110 is provided with one or more tapped bores 111 for receiving bolts or the like for anchoring a suitable electric conductor to cap 110. For example, in a station post insulator, the cap 110 will generally support a bus bar of a rectangular or tubular shape, and of various dimensions. The cap 110 may also support other apparatus associated with the bus bar or with the electric coupling device. It is also possible to use a top cap which is designed for engagement with the roughened surface 94, thus providing ready interchangeability with respect to the conductor mounting caps used on insulator 95.

The electrical device shown in FIGS. 13–17 includes a sensing coil assembly 115 and a reference coil assembly 120. These two assemblies are held in properly oriented and coordinated relation by means of a strap-type bracket generally indicated at 112. Bracket 112 is generally rectangular in elevation, including a transversely extending bight portion 113, side legs 114, and overlapped inturned ends 116. These ends 116 are apertured to receive a stud 117 in the base of coil assembly 115, and to be anchored to this coil assembly by means of a nut 118 threaded on the stud 117. An elongated nut 121 is secured to a similar stud on the base of coil assembly 120 and has threaded thereinto a relatively elongated stud 122 extending through an aperture in the bight 113 of bracket 114. Lock nuts 123, engaged with stud 122 and on either side of bight 113, hold coil assembly 120 in vertically adjusted relation with respect to coil assembly 115, and also in angularly adjusted relation with respect to coil assembly 115. Stud 122 may extend into a mounting tube 124. A relatively large diameter conductor tube 125 is fixed into cement 102 and extends substantially centrally of insulator 95, this tube enclosing the conductors from the coil assemblies 115 and 120 and serving to lead these conductors to the base where they are brought out through notch 98 and aperture 106 for connection to the terminal pins of male connector element 105M.

Referring to FIGS. 15 and 16, each of the coil assemblies 115 and 120 includes an enclosure similar to the enclosure of the coil assembly of FIGS. 8–12. This enclosure thus includes a cap, can, or cup 50" and a base 84' in the same manner as described for the coil assembly 80. Furthermore, base 84' is provided with a mounting stud, such as 117, and with terminals 90' extending in sealed insulated relation therethrough. In this instance, however, both of the terminals 90', one of which is a "start" or S terminal, and the other of which is a "finish" or F terminal, are located near the periphery of base 84'. Each assembly 115 and 120 includes two coils. In the same manner as described for the coil assembly 80, each of the sensing and reference coils is wound on a spool 56' and includes a magnetic core 57'. The winding on each spool 56' is divided into two sections by a separator 54' and, for each assembly 115 and 120, the four windings are designated A, B, C and D. Magnetic pole pieces 58' are provided for the coils, with each magnetic pole piece extending across the end of a pair of dual windings, in association with the magnetic cores 57'.

The two dual windings of each coil assembly 115 and 120 are supported by a pair of L-shaped brackets 126 which are riveted or the like to base 84' and have apertures receiving the ends of magnetic cores 57'. To hold the dual windings 130 in proper angular orientation with respect to the magnetic end plates 58' and the terminals 90', one end member of each spool 56' is provided with an eccentric pin 127 which is arranged to engage in an aperture 128 in the adjacent magnetic end plate 58'.

The coil assemblies 115 and 120 are encased within a potting compound which may be a silicon rubber such as, for example, "Sylgard," as indicated at 131.

Before the coil assemblies 115 and 120 are placed within insulator 95, a mutual adjustment thereof is effected. First, the sensing coil assembly 115 is rotated to obtain a maximum output. Then the sensing coil assembly is held stationary while the reference coil assembly 120 is rotated for maximum output. The height of the reference coils is then adjusted, by loosening lock nuts 123, relative to the sensing coils until the reference coil output is a predetermined percentage of the sensing coil output. The reference coil assembly is then locked in position by tightening lock nuts 123, and the assembly 120 may be taped to the bracket 112 to maintain the adjusted angular position. After the two assemblies, interconnected by the mounting of bracket 112, are placed within insulator 95, the proper orientation of the combined assembly is adjusted while measuring the sensing coil output. The potting compound 131 is then applied within the insulator 95.

Figure 17:
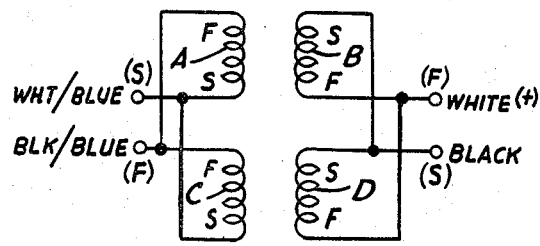
FIG. 17 is a schematic wiring diagram of the coils included in the assembly shown in FIGS. 15 and 16.

Referring to FIG. 17, the coils or windings of each assembly 115 or 120 may be connected in various relations as may be particularly appropriate for any given situation. For example, the four windings A, B, C and D may be connected in series aiding relation or in parallel aiding relation.

One of the primary features of the invention is the enclosure of the coil assemblies which, as stated, has to be a material which has a very low resistance or a very high conductivity, and may be copper or the like. Thereby line current surges and disturbances can be protected against. It is, however, equally important that the enclosure itself, as well as its contents, be protected against corrosion. The copper enclosure should be encased or enclosed in a material which will resist corrosion, and one material is stainless steel which can be provided on the exterior of an enclosure of a low resistance metal, such as copper or the like. However, other corrosion resisting materials may be used.

The interior of the porcelain insulator can be filled, or at least partially filled, with the usual compounds for such purposes, and which are generally known as "potting compounds." One of these potting compounds may be used. Other materials which may be used for insulating purposes within the porcelain insulator are that known as the potting compound "Sylgard" and the gas sulfur hexafluoride. The conductor tube, such as the tube 82 or the tube 125 may be used to support the coil assembly or coil assemblies. However, these assemblies may be supported solely by the potting compound.

The enclosure for the coil assembly provides surge shielding by virtue of containing copper or aluminum or other lower resistivity material, and also provides a corona shield. Shielding against corrosion is provided by acid resistant material, such as stainless steel, nickel, or other materials inert to nitric acid. The magnetic pole pieces provide for the capturing of the maximum primary conductor flux, and the solid headers such as 90, provide terminations for the leads and connections without permitting escape or entrance of air, gas, or moisture into the coil assemblies.

A feature of the invention is the use of an inert gas within the hermetically sealed coil assemblies. This inert gas may be any one of several types. Preferably, the gas is an electro-negative gas such as $SF_6$. Such an inert gas may be introduced within the porcelain housing or insulator, to replace the potting compound. The use of an electro-negative gas is very advantageous, particularly from the standpoint of use of the coupling device with very high voltages. It is of interest to note that the insulation is provided, in the case of using a potting compound, by the combination of the insulator and the potting compound. When using an electro-negative gas, the total insulation is provided by the insulator plus the gas under superatmospheric pressure. It is much more practical, for example, to use such a gas in instances where there may be a metal plate at the top of the insulator, rather than to use a potting compound, as the gas itself can form the electrical insulation between the metal plate and the components within he insulator. The metal plate just referred to is used in the case wherein the insulator may be a ceramic tube open at both ends with a metal plate closing the outer end. However, it should be noted that a metal plate is used very frequently on top of an insulator which is a ceramic tube having a closed outer end, so that porcelain is interposed between the metal plate and the interior of the insulator.

The importance of the several features of the invention will be apparent when it is considered that, when coils or windings are placed adjacent to high voltage lines, they are subjected to all of the electrical effects of the high voltage lines. Thus, unprotected coils may be damaged from the effects of transients caused by the lighting and switching surges, or from the effects of the high electric field.

While specific embodiments of the invention have been shown and described in detail to ilustrate the application of the principles of the invention, it will be understood that the invention may be embodied otherwise without departing from such principles.

What is claimed is:

1. A coupling device for inductive coupling to a high voltage power line current conductor, and serving as a fixed insulating support for the conductor, comprising, in combination, a high voltage hollow insulator having a closed outer end and an open inner end, the exterior of the closed end having means for receiving a current conductor on said insulator and enabling said insulator to be located in predetermined angular orientation with respect to the longitudinal extent of the supported conductor; a coil mounted within said insulator adjacent the closed end thereof, with the axis of the coil in predetermined orientation with respect to the longitudinal direction of a conductor supported on the exterior of said closed end, and with the coil spaced inwardly from such conductor; an enclosure of highly electrically conductive and non-magnetic metal enclosing said coil within said insulator; a metal base covering the open end of said insulator; means sealing said base on said insulator; plural solid electrically conductive metal terminals mounted in sealed insulated relation in a wall of said enclosure; coil leads extending from said coil and connected to said terminals within said enclosure; and output leads connected to said terminals exteriorly of said enclosure and extending through and insulated from said base.

2. A coupling device for inductive coupling to a high voltage power line current conductor, and serving as a fixed insulating support for the conductor, comprising, in combination, a high voltage hollow insulator having an open inner and a closed outer end, the exterior of said closed end having means for receiving and supporting a current conductor on said insulator, and enabling said insulator to be located in predetermined angular orientation with respect to the longitudinal extent of a conducor supported thereon; a base covering the open end of said insulator; means sealing said base on said insulator; a sensing coil mounted within said insulator adjacent the closed end thereof and with the axis of the coil in predetermined angular orientation with respect to the longitudinal extent of the conductor supported on the insulator, said sensing coil being spaced inwardly from a conductor supported on said insulator; a compensating coil mounted within said insulator adjacent said sensing coil and adjustable relative to said sensing coil to compensate said sensing coil for variations in the effective heights of conductors supported on said insulator; and output leads extending from said sensing coil and said compensating coil through and insulated from said base.

3. A coupling device for inductive coupling to a high voltage power line current conductor, as claimed in claim 2, including means sealingly enclosing said sensing and compensating coils in highly electrically conductive and non-magnetic metal.

4. A coupling device for inductive coupling to a high voltage power line current conductor, as claimed in claim 2, including an enclosure of highly electrically conductive and non-magnetic metal forming a sealed enclosure for said coils.

5. A coupling device for inductive coupling to a high voltage power line current conductor, as claimed in claim 2, including a pair of highly electrically conductive and non-magnetic material enclosures, each forming a sealed enclosure for a respective one of said sensing coil and said compensating coil.

6. A coupling device for inductive coupling to a high voltage power line current conductor, and serving as a fixed insulating support for the conductor, comprising, in combination, a high voltage hollow insulator having an open inner and a closed outer end, the exterior of said closed end having means for receiving and supporting a current conductor on said insulator, and enabling said insulator to be located in predetermined angular orientation with respect to the longitudinal extent of a conductor supported thereon; a base covering the open end of said insulator; means sealing said base on said insulator; a coil mounted within said insulator adjacent the closed end thereof with the axis of said coil in predetermined angular orientation with respect to the longitudinal extent of a conductor supported on said insulator; and with said coil spaced inwardly from said conductor; said coil including a tubular coil form on which said coil is wound, a core of magnetic material extending longitudinally through and beyond the ends of said form, and laterally extending magnetic pole pieces secured on the projecting ends of said core to increase the magnetic pick-up; and output leads extending from said coil through an insulator from said base.

7. A coupling device for inductive coupling to a high voltage power line current conductor, and serving as a fixed insulating support for the conductor, comprising, in combination, a high voltage hollow insulator having an open inner and a closed outer end, the exterior of said closed end having means for receiving and supporting a current conductor on said insulator, and enabling said insulator to be located in predetermined angular orientation with respect to the longitudinal extent of a conductor supported thereon; a base covering the open end of said insulator; means sealing said base on said insulator; a pair of sensing coils mounted in laterally adjacent relation within said insulator adjacent the closed end thereof, with the axes of the sensing coils in predetermined angular orientation with respect to the longitudinal extent of a conductor supported on said insulator, and with said sensing coils spaced inwardly from such conductor; a pair of compensating coils mounted in laterally adjacent relation within said insulator, each adjacent a sensing coil, said compensating coils being mounted for adjustment with respect to the associated sensing coils to compensate said sensing coils for variations in the heights of conductors supported on said insulator; highly electrically conductive and non-magnetic metal sealingly enclosing said sensing coils and said compensating coils and provided with solid electrically conductive metal terminals extending inwardly and outwardly thereof; coil leads connecting said coils to inner ends of respective terminals; and output leads connected to the outer ends of respective terminals and extending through and insulated from said base.

8. A coupling device for inductive coupling to a high voltage power line current conductor, as claimed in claim 7, in which each of said sensing coils is subdivided into axially adjacent and coaxial sections.

9. A coupling device for inductive coupling to a high voltage power line current conductor, as claimed in claim 7, in which said coil enclosing metal comprises first and second highly electrically conductive and non-magnetic metal enclosures forming sealing enclosures for said sensing coils and said compensating coils, respectively, each enclosure including a substantially cup-shaped cap and a base sealed to said cap; each base having plural solid electrically conductive metal terminals extending in sealed insulated relation therethrough; coil leads extending from the coils within each enclosure to the inner ends of respective terminals of the enclosure and electrically connected to the latter; said first-named base being formed with an outlet nipple extending laterally therefrom and said insulator being formed with a notch laterally aligned with said nipple; a support tube extending from adjacent said notch through said insulator; output leads extending from the outer ends of said terminals in insulated relation through said support tube and outwardly through said notch and said nipple; a bracket adjustably mounted on said support tube and supporting said first enclosure; and means adjustably supporting said second enclosure on said bracket for adjustment relative to said first enclosure.

References Cited
UNITED STATES PATENTS

| | | | |
|---|---|---|---|
| 2,467,531 | 4/1949 | Lamphene et al. | 336—107 XR |
| 2,677,077 | 4/1954 | Knudson | 336—107 XR |
| 2,945,912 | 7/1960 | Imhof | 174—30 |
| 3,091,731 | 5/1963 | Stein | 323—102 |
| 3,187,282 | 6/1965 | Pierce et al. | 336—84 XR |
| 3,251,014 | 5/1966 | Stein | 336—90 |

DARRELL L. CLAY, *Primary Examiner.*

LEWIS H. MYERS, *Examiner.*

T. J. KOZMA, *Assistant Examiner.*